United States Patent
Takeda

(10) Patent No.: US 11,269,730 B2
(45) Date of Patent: Mar. 8, 2022

(54) MANAGEMENT METHOD, STRUCTURE MONITORING DEVICE, AND STRUCTURE MONITORING SYSTEM

(71) Applicant: SEIKO EPSON CORPORATION, Tokyo (JP)

(72) Inventor: Kazuyoshi Takeda, Chino (JP)

(73) Assignee: Seiko Epson Corporation, Tokyo (JP)

( * ) Notice: Subject to any disclaimer, the term of this patent is extended or adjusted under 35 U.S.C. 154(b) by 150 days.

(21) Appl. No.: 16/749,685

(22) Filed: Jan. 22, 2020

(65) Prior Publication Data

US 2020/0233748 A1 Jul. 23, 2020

(30) Foreign Application Priority Data

Jan. 23, 2019 (JP) .............................. JP2019-009505

(51) Int. Cl.
*G06F 11/30* (2006.01)
*G06F 11/14* (2006.01)
*G06F 11/34* (2006.01)

(52) U.S. Cl.
CPC ........ *G06F 11/1438* (2013.01); *G06F 11/302* (2013.01); *G06F 11/3089* (2013.01); *G06F 11/3452* (2013.01)

(58) Field of Classification Search
CPC .............. G06F 11/1438; G06F 11/302; G06F 11/3089; G06F 11/3452; G06F 11/3466; G06F 11/30; G05B 19/0428; G05B 19/048
See application file for complete search history.

(56) References Cited

U.S. PATENT DOCUMENTS

| | | | | |
|---|---|---|---|---|
| 4,654,821 A | * | 3/1987 | Lapp | ......................... G06F 1/24 713/2 |
| 6,732,359 B1 | * | 5/2004 | Kirkpatrick | ......... G06F 11/1438 714/E11.137 |
| 2010/0281978 A1 | * | 11/2010 | Chang | ................... G01P 15/006 73/514.11 |
| 2014/0279608 A1 | * | 9/2014 | Horst | ................... G06Q 30/018 705/317 |
| 2015/0346760 A1 | * | 12/2015 | Kishiro | ................. H04J 3/0661 713/503 |
| 2019/0294136 A1 | * | 9/2019 | Iacobone | ........... G05B 19/0428 |

FOREIGN PATENT DOCUMENTS

| | | |
|---|---|---|
| JP | 2016-001414 | 5/2002 |
| JP | 2002-149437 | 1/2016 |

* cited by examiner

*Primary Examiner* — Yolanda L Wilson
(74) *Attorney, Agent, or Firm* — Workman Nydegger

(57) ABSTRACT

Structure monitoring software includes measuring software, arithmetic software, and communication software. The measuring software collects an output signal from an inertial sensor, stores a result of collection into a first storage unit, and outputs the result of collection to the arithmetic software. The arithmetic software computes the result of collection received from the measuring software, stores a result of computation into a second storage unit, and outputs the result of computation to the communication software. The communication software stores the result of computation received from the arithmetic software into a third storage unit and transmits the result of computation to outside. Management software determines whether each of the measuring software, the arithmetic software, and the communication software is operating normally or not, and terminates and restarts the software that is not operating normally.

8 Claims, 3 Drawing Sheets

MANAGEMENT METHOD, STRUCTURE MONITORING DEVICE, AND STRUCTURE MONITORING SYSTEM

The present application is based on, and claims priority from JP Application Serial Number 2019-009505, filed Jan. 23, 2019, the disclosure of which is hereby incorporated by reference herein in its entirety.

BACKGROUND

1. Technical Field

The present disclosure relates to a management method, a structure monitoring device, and a structure monitoring system.

2. Related Art

A monitoring and reporting device described in JP-A-2016-1414 constantly monitors the operation of monitoring target software, and terminates and restarts the target software when an operation error is detected.

A structure monitoring system needs to constantly acquire and analyze data from a sensor provided in a structure. However, when software is terminated and restarted as in JP-A-2016-1414, data acquired from the sensor may be lost.

SUMMARY

A management method according to an aspect of the present disclosure is a management method for structure monitoring software based on management software. The structure monitoring software includes measuring software, arithmetic software, and communication software. The measuring software collects an output signal from an inertial sensor, stores a result of collection into a first storage unit, and outputs the result of collection to the arithmetic software. The arithmetic software computes the result of collection received from the measuring software, stores a result of computation into a second storage unit, and outputs the result of computation to the communication software. The communication software stores the result of computation received from the arithmetic software into a third storage unit and transmits the result of computation to outside. The management software determines whether each of the measuring software, the arithmetic software, and the communication software is operating normally or not, and terminates and restarts the software that is not operating normally.

DESCRIPTION OF EXEMPLARY EMBODIMENTS

The management method, the structure monitoring device, and the structure monitoring system according to the present disclosure will now be described in detail, based on an embodiment shown in the accompanying drawings.

Figure 1:
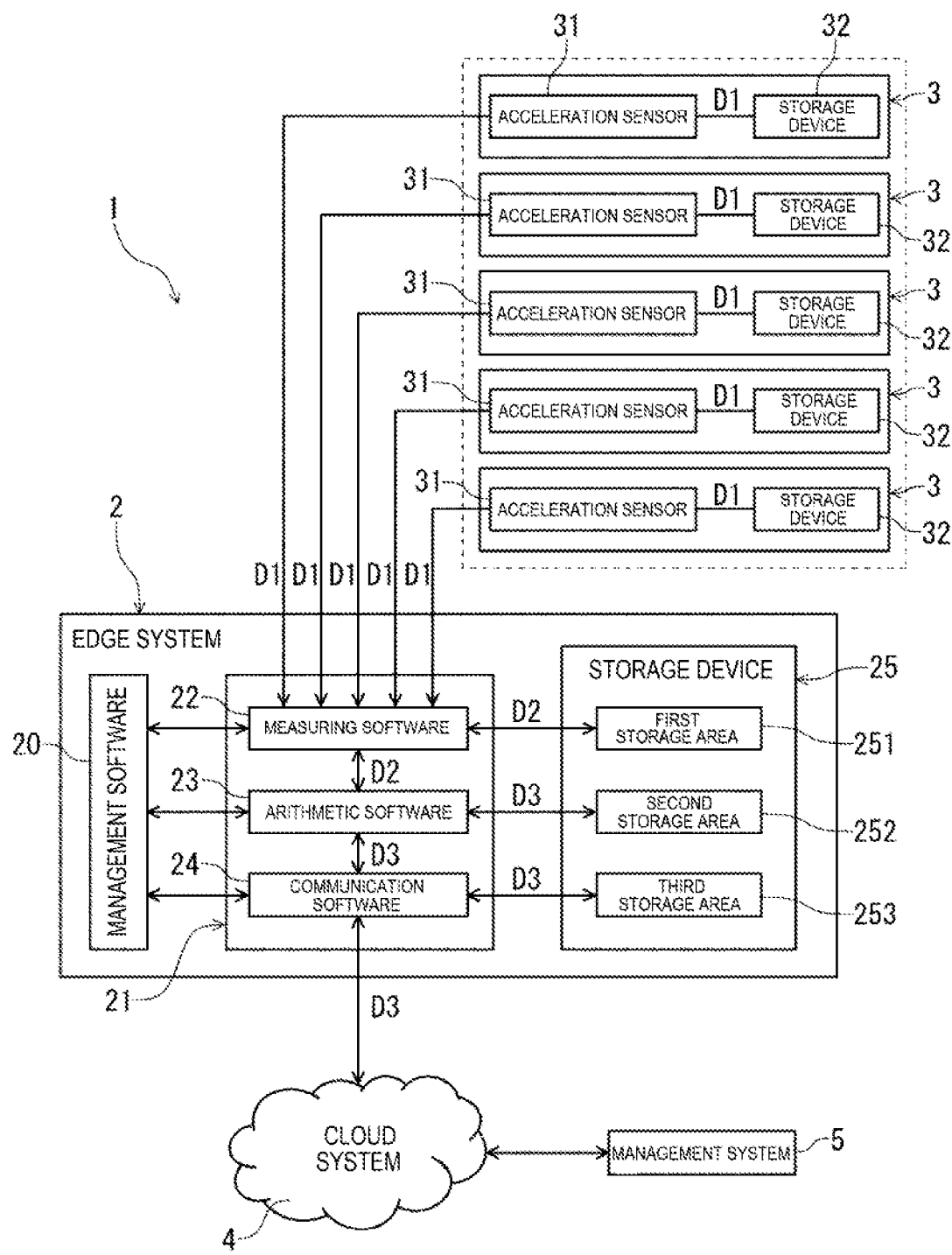
FIG. 1 is a block diagram showing a structure monitoring system according to a preferred embodiment.
Figure 3:
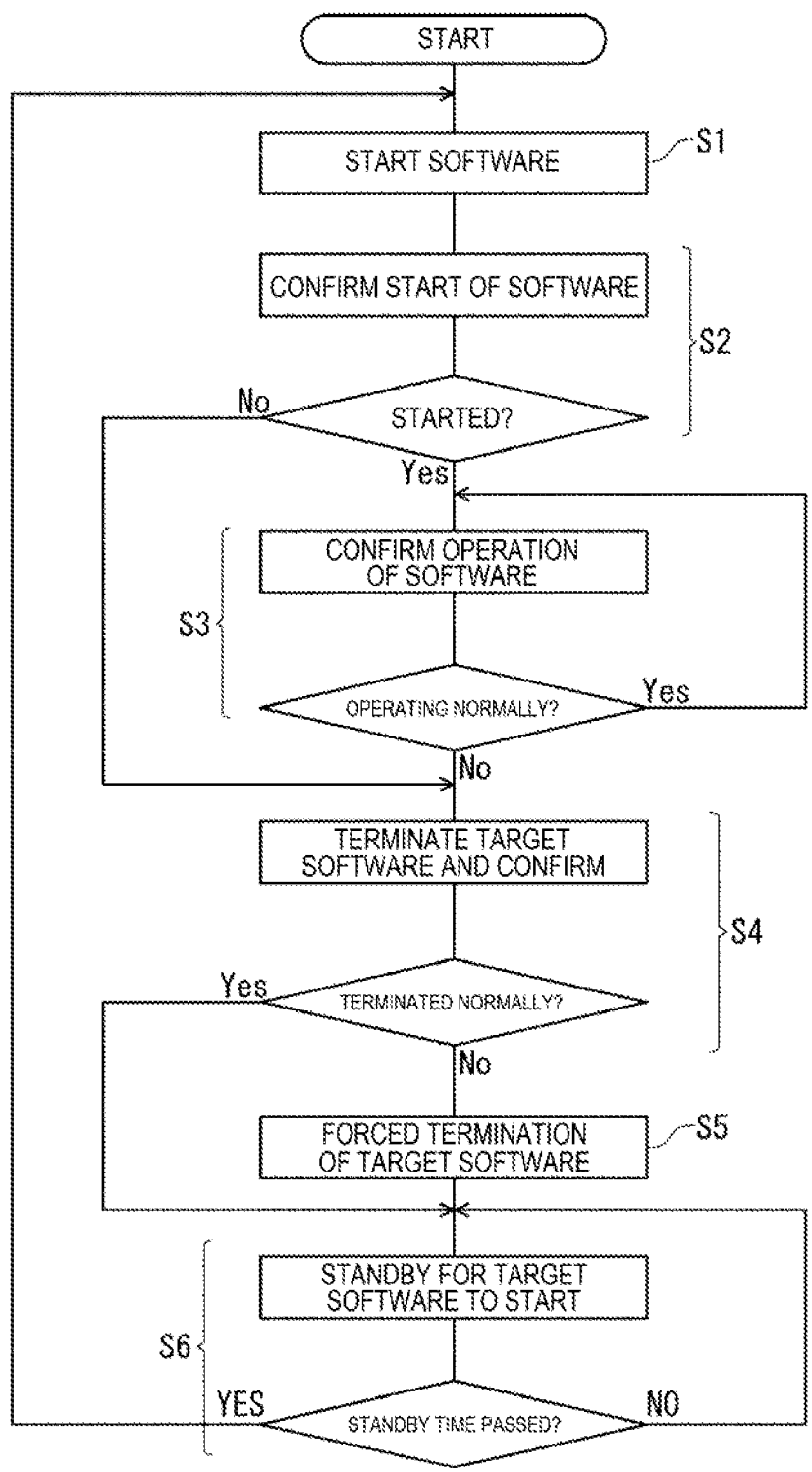
FIG. 3 is a flowchart showing a management method for the structure monitoring system.

FIG. 1 is a block diagram showing a structure monitoring system according to a preferred embodiment. FIG. shows an example of a structure where an acceleration detection device is arranged. FIG. 3 is a flowchart showing a management method for the structure monitoring system.

Figure 2:
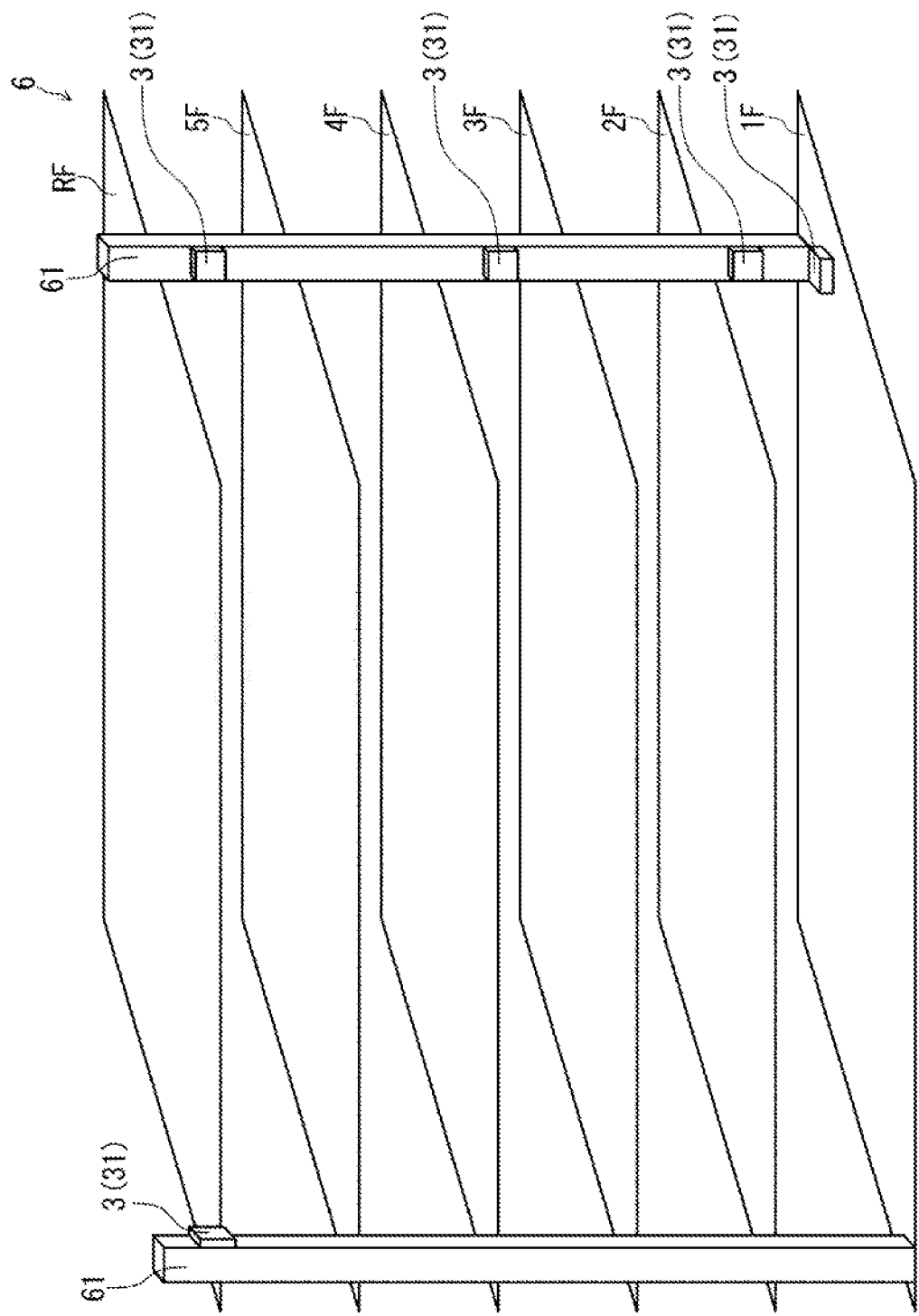
FIG. 2 shows an example of a structure where an acceleration detection device is arranged.

A structure monitoring system 1 shown in FIG. 1 is a system which detects and monitors the state of a structure of various kinds such as a building or pylon, based on an output signal outputted from an acceleration detection device 3 installed in the structure. In this embodiment, a plurality of acceleration detection devices 3 are installed in a building 6, as shown in FIG. 2. The structure monitoring system 1 detects and monitors the state of the building 6, based on an output signal outputted from the acceleration detection devices 3.

The building 6 is a five-story building having floors 1F to 5F, a roof RF, and steel poles 61. The plurality of acceleration detection devices 3 are installed in this building 6. Specifically, the acceleration detection device 3 is installed at the steel pole 61 at four positions, that is, between the floor 1F and the floor 2F, between the floor 3F and the floor 4F, between the floor 5F and the roof RF, and on the roof RF. Also, one acceleration detection device 3 is installed on the floor 1F. Thus, in this embodiment, five acceleration detection devices 3 are provided at positions of different heights in the building 6. However, the arrangement and number of acceleration detection devices 3 are not particularly limited and can be suitably changed according to the size or the like of the building 6.

As shown in FIG. 1, the structure monitoring system 1 has an edge system 2, which is a structure monitoring device, and the plurality of acceleration detection devices 3 communicatively coupled to the edge system 2. The structure monitoring system 1 is also communicatively coupled to a cloud system 4. Also, a management system 5 is communicatively coupled to the cloud system 4. The management system 5 is installed in a remote place from the building 6. The edge system 2 is installed inside the building 6. A supervisor of the building 6 can monitor the state of the building 6 even from a remote place via the management system 5. However, the installation site of the management system 5 and the edge system 2 is not particularly limited.

In the related-art structure monitoring system, when an error has occurred in the operation of the edge system 2, the supervisor visits the building 6 and restores the edge system 2, that is, terminates and restarts the edge system 2 at the site or restores the edge system 2 by remote control from the management system 5 via the cloud system 4. However, in the former case, the supervisor needs to visit the building 6 and therefore the recovery of the edge system 2 takes time and effort. In the latter case, communication response may be poor depending on the communication environment and therefore the recovery of the edge system 2 may take time. Thus, in the structure monitoring system 1 in this embodiment, the edge system 2 itself detects an error and restores itself when an error has occurred. Therefore, the structure monitoring system 1 is an excellent system which resolves the foregoing problem and where the recovery of the edge system 2 does not take much time and effort.

The acceleration detection device 3 has an acceleration sensor 31 as an inertial sensor, and a storage device 32 as a fourth storage unit storing an output signal D1 outputted from the acceleration sensor 31. The acceleration sensor 31 is, for example, a three-axis acceleration sensor that can detect an acceleration along each of three axes orthogonal to each other. As the storage device 32, for example, a semiconductor memory, register, hard disk device, optical disk device or the like can be used. However, the configuration of the acceleration detection device 3 is not particularly limited.

The acceleration detection device 3 stores the output signal D1 from each acceleration sensor 31 into the storage device 32 and outputs the output signal D1 to measuring software 22, described later. Since the acceleration detection device 3 stores the output signal D1 in the storage device 32 in this way, the output signal D1 is not lost, for example, even when an error occurs in the operation of the measuring software 22 and the measuring software 22 cannot receive the output signal D1 from each acceleration sensor 31. Thus, after restart, the measuring software 22 can receive the output signal D1 that the measuring software 22 could not previously receive due to the error.

The edge system 2 is formed of, for example, a computer, and has a processor (CPU) processing information, a memory communicatively coupled to the processor, and an external interface. Various programs that can be executed by the processor are saved in the memory. The processor can read and execute the various programs stored in the memory, particularly, structure monitoring software 21, described later.

The edge system 2 has the structure monitoring software 21 monitoring a displacement of the building 6, management software 20 managing the structure monitoring software 21, and a storage device 25 storing information. The structure monitoring software 21 has the measuring software 22, arithmetic software 23, and communication software 24. The management software 20 can communicate with each of the measuring software 22, the arithmetic software 23, and the communication software 24, and manages the operation of these pieces of software 22, 23, 24. The communication protocol is not particularly limited. For example, TCP/IP can be used.

The storage device 25 is, for example, a buffer storage device. In this device, a first storage area 251 as a first storage unit a second storage area 252 as a second storage unit, and a third storage area 253 as a third storage unit are provided. However, these first to third storage areas 251 to 253 may not have to be discriminated from each other. As the storage device 25, for example, a semiconductor memory, register, hard disk device, optical disk device or the like can be used. While the first to third storage areas 251 to 253 are set within one piece of hardware in this embodiment, this is not limiting. The first to third storage areas 251 to 253 may be formed of different pieces of hardware from each other.

The measuring software 22 is communicatively coupled to each acceleration sensor 31. The coupling between the measuring software 22 and each acceleration sensor 31 may be wireless or wired. The measuring software 22 receives the output signal D1 outputted from each acceleration sensor 31, collects the result thereof, stores a result of collection D2 into the first storage area 251, and outputs the result of collection D2 to the arithmetic software 23. Since the measuring software 22 stores the result of collection D2 into the first storage area 251 in this way, the result of collection D2 is not lost, for example, even when an error occurs in the operation of the arithmetic software 23 and the arithmetic software 23 cannot receive the result of collection D2 outputted from the measuring software 22. Therefore, after restart, the arithmetic software 23 can receive the result of collection D2 that the arithmetic software 23 could not previously receive due to the error. As the result of collection D2, for example, the output signal D1 from each acceleration sensor 31 is recorded along with time or a count value based on a reference clock. Thus, the time of acquisition of each output signal D1 can be learned and a displacement of the building 6 can be monitored in time series. The restart refers to terminating and restarting various kinds of software such as the measuring software 22, the arithmetic software 23, and the communication software 24.

The arithmetic software 23 computes the result of collection D2 received from the measuring software 22 and calculates the displacement of the building 6. The arithmetic software 23 then stores a result of computation D3 into the second storage area 252 and outputs the result of computation D3 to the communication software 24. Since the arithmetic software 23 stores the result of computation D3 into the second storage area 252 in this way, the result of computation D3 is not lost, for example, even when an error occurs in the communication software 24 and the communication software 24 cannot receive the result of computation D3 outputted from the arithmetic software 23. Therefore, after restart, the communication software 24 can receive the result of computation D3 that the communication software 24 could not previously receive due to the error.

The communication software 24 stores the result of computation D3 received from the arithmetic software 23 into the third storage area 253 and transmits the result of computation D3 to the cloud system 4. Thus, the result of computation D3 is stored in the cloud system 4, and the result of computation D3, that is, the state of the building 6, can be checked from the management system 5.

The management software 20 can communicate with each of the measuring software 22, the arithmetic software 23, and the communication software 24. The management software 20 also determines whether each of the measuring software 22, the arithmetic software 23, and the communication software 24 is operating normally or not. For this determination, for example, the management software 20 sends a start confirmation command to target software. When a response notifying normal operation is returned from the target software, the management software 20 determines that the target software is operating normally. When a response notifying an abnormality is returned from the target software or when no response is returned from the target software, the management software 20 determines that the target software has an abnormality, that is, an error.

The management software 20 then terminates and restarts the software where an error is detected. That is, when an error has occurred in the measuring software 22, the management software 20 terminates and restarts the measuring software 22. When an error has occurred in the arithmetic software 23, the management software 20 terminates and restarts the arithmetic software 23. When an error has occurred in the communication software 24, the management software 20 terminates and restarts the communication software 24. In such a system, recovery from an error is automatically made in the edge system 2. Therefore, recovery from an error can be swiftly made without causing trouble to the manager. Also, since only the software where an error has occurred is terminated and restarted, the recovery is not time-consuming. Therefore, the structure monitoring system 1 is highly convenient. When the software where an error has occurred is not terminated normally, the management software 20 may perform forced termination of the software.

For example, when an error occurs in the measuring software 22 and the measuring software 22 cannot receive the output signal D1 from each acceleration sensor 31, each acceleration detection device 3 reads out, from the storage device 32, the output signal D1 after the time when the measuring software 22 can no longer receive the output signal D1 due to the error, that is, the output signal D1 after the last output signal D1 received by the measuring software 22 from each acceleration detection device 3, and the acceleration detection device 3 outputs the read-out output signal D1 to the measuring software 22, after the measuring software 22 is restarted. Thus, the output signal D1 is not lost and the state of the building 6 can be accurately monitored.

Similarly, when an error occurs in the arithmetic software 23 and the arithmetic software 23 cannot receive the result of collection D2 from the measuring software 22, the measuring software 22 reads out, from the first storage area 251, the result of collection D2 after the time when the arithmetic software 23 can no longer receive the result of collection D2 due to the error, that is, the result of collection D2 after the last result of collection D2 received by the arithmetic software 23 from the measuring software 22, and the measuring software 22 outputs the read-out result of collection D2 to the arithmetic software 23, after the arithmetic software 23 is restarted. Thus, the result of collection D2 is not lost and the state of the building 6 can be accurately monitored.

Similarly, when an error occurs in the communication software 24 and the communication software 24 cannot receive the result of computation D3 from the arithmetic software 23, the arithmetic software 23 reads out, from the second storage area 252, the result of computation D3 after the time when the communication software 24 can no longer receive the result of computation D3 due to the error, that is, the result of computation D3 after the last result of computation D3 received by the communication software 24 from the arithmetic software 23, and the arithmetic software 23 outputs the read-out result of computation D3 to the communication software 24, after the communication software 24 is restarted. Thus, the result of computation D3 is not lost and the state of the building 6 can be accurately monitored.

Similarly, when communication with the cloud system 4 is disabled and the communication software 24 cannot transmit the result of computation D3 to the cloud system 4, the communication software 24 reads out, from the third storage area 253, the result of computation D3 after the time when the communication is disabled, that is, the result of computation D3 after the last result of computation D3 transmitted to the cloud system 4, and the communication software 24 outputs the read-out result of computation D3 to the cloud system 4, after the communication is restored. Thus, the result of computation D3 is not lost and the state of the building 6 can be accurately monitored.

When an error has occurred in a plurality of pieces of software including the communication software 24, of the measuring software 22, the arithmetic software 23, and the communication software 24, the management software 20 terminates the other software where an error has occurred than the communication software 24 before terminating the communication software 24. For example, when an error has occurred in the measuring software 22 and the communication software 24, the management software 20 terminates the measuring software 22 and subsequently terminates the communication software 24. Since the communication software 24 is terminated lastly in this way, that the other software has been terminated normally can be transmitted to the cloud system 4 through the communication software 24. Therefore, the supervisor can confirm that the software has been terminated normally, by accessing the cloud system 4. However, this is not limiting. The communication software 24 may be terminated first or may be terminated simultaneously with the other software where an error has occurred.

A management method for the edge system 2 will now be described with reference to the flowchart shown in FIG. 3. First, in step S1, the management software 20 starts the measuring software 22, the arithmetic software 23, and the communication software 24. Next, in step S2, the management software 20 confirms the start of each of the measuring software 22, the arithmetic software 23, and the communication software 24, by a start confirmation command. When the respective pieces of software 22 to 24 start normally, the foregoing processing by the software 22 to 24 is then started.

Next, in step S3, the management software 20 confirms whether the respective pieces of software 22 to 24 are operating normally or not, by a software operation confirmation command. When the respective pieces of software 22 to 24 are operating normally, the management software 20 periodically repeats this step S3. Meanwhile, when an error is detected in the operation of at least one of the respective pieces of software 22 to 24, the management software 20 in step S4 terminates the software where an error has been detected, and then confirms that the software has been terminated normally. Also, when any of the respective pieces of software 22 to 24 is not started normally in step S2, the management software 20 proceeds to step S4, terminates the software that has not been started normally, and confirms that the software has been terminated normally. When the target software is not terminated normally, the management software 20 in step S5 executes forced termination of the software.

In step S6, after the lapse of a start standby time, the management software 20 restarts the software that has been terminated in step S4 or step S5. In the management method as described above, recovery from an error is automatically made within the edge system 2. Therefore, recovery from an error can be swiftly made without causing trouble to the manager. Also, since only the software where an error has occurred is terminated and restarted, the recovery is not time-consuming. Therefore, the structure monitoring system 1 is highly convenient.

The configuration of the structure monitoring system 1 has been described above. As described above, in the management method for the structure monitoring software 21 based on the management software 20, the structure monitoring software 21 has the measuring software 22, the arithmetic software 23, and the communication software 24. The measuring software 22 collects the output signal D1 from the acceleration sensor 31, which is an inertial sensor, then stores the result of collection D2 into the first storage area 251, which is the first storage unit, and outputs the result of collection D2 to the arithmetic software 23. The arithmetic software 23 computes the result of collection D2 received from the measuring software 22, then stores the result of computation D3 into the second storage area 252, which is the second storage unit, and outputs the result of computation D3 to the communication software 24. The communication software 24 stores the result of computation D3 received from the arithmetic software 23 into the third storage area 253, which is the third storage unit, and transmits the result of computation D3 to the external cloud system 4. The management software 20 determines whether each of the measuring software 22, the arithmetic software 23, and the communication software 24 is operating normally or not. The management software 20 terminates and restarts the software that is not operating normally.

In the management method as described above, the management software 20 automatically recovers the structure monitoring software 21 from an error. Therefore, recovery from an error can be swiftly made without causing trouble to the manager. Also, since only the software where an error has occurred is terminated and restarted, the recovery is not time-consuming. Therefore, a highly convenient management method is provided.

As described above, the acceleration sensor 31 stores the output signal in the storage device 32, which is the fourth storage unit, and also outputs the output signal to the measuring software 22. Thus, the output signal D1 is not lost, even when an error occurs in the measuring software 22 and the measuring software 22 cannot receive the output signal D1 from the acceleration sensor 31.

As described above, when the measuring software 22 is not operating normally and the management software 20 terminates the measuring software 22, the measuring software 22, after restart, receives the output signal D1 after the output signal D1 that the measuring software 22 has received before the termination. Thus, the output signal D1 is not lost, even when an error occurs in the measuring software 22 and the measuring software 22 cannot receive the output signal D1 from the acceleration sensor 31.

As described above, when the arithmetic software 23 is not operating normally and the management software 20 terminates the arithmetic software 23, the arithmetic software 23, after restart, receives the result of collection D2 after the result of collection D2 that the arithmetic software 23 has received before the termination. Thus, the result of collection D2 is not lost, even when an error occurs in the arithmetic software 23 and the arithmetic software 23 cannot receive the result of collection D2 from the measuring software 22.

As described above, when the communication software 24 is not operating normally and the management software 20 terminates the communication software 24, the communication software 24, after restart, receives the result of computation D3 after the result of computation D3 that the communication software 24 has received before the termination. Thus, the result of computation D3 is not lost, even when an error occurs in the communication software 24 and the communication software 24 cannot receive the result of computation D3 from the arithmetic software 23.

As described above, when a plurality of pieces of software including communication software 24 are not operating normally in the structure monitoring software 21, the management software 20 terminates the other software than the communication software 24 before terminating the communication software 24. Thus, the communication software 24 can transmit that the other software has been terminated normally, to the cloud system 4. Therefore, the supervisor can confirm that the other software than the communication software 24 has been terminated normally, by accessing the cloud system 4.

As described above, the edge system 2 as a structure monitoring device has the structure monitoring software 21 and the management software 20 managing the structure monitoring software 21. The structure monitoring software 21 has the measuring software 22, the arithmetic software 23, and the communication software 24. The measuring software 22 collects the output signal D1 from the acceleration sensor 31, stores the result of collection D2 into the first storage area 251, and outputs the result of collection D2 to the arithmetic software 23. The arithmetic software 23 computes the result of collection D2 received from the measuring software 22, then stores the result of computation D3 into the second storage area 252, and outputs the result of computation D3 to the communication software 24. The communication software 24 stores the result of computation D3 received from the arithmetic software 23 into the third storage area 253 and transmits the result of computation D3 to the external cloud system 4. The management software 20 determines whether each of the measuring software 22, the arithmetic software 23, and the communication software 24 is operating normally or not. The management software 20 terminates and restarts the software that is not operating normally.

In the edge system 2 as described above, the management software 20 automatically recovers the structure monitoring software 21 from an error. Therefore, recovery from an error can be swiftly made without causing trouble to the manager. Also, since only the software where an error has occurred is terminated and restarted, the recovery is not time-consuming. Therefore, the edge system 2 is highly convenient.

As described above, the structure monitoring system 1 has the structure monitoring software 21, the management software 20 managing the structure monitoring software 21, and the acceleration sensor 31 communicatively coupled to the structure monitoring software 21. The structure monitoring software 21 has the measuring software 22, the arithmetic software 23, and the communication software 24. The measuring software 22 collects the output signal D1 from the acceleration sensor 31, stores the result of collection D2 into the first storage area 251, and outputs the result of collection D2 to the arithmetic software 23. The arithmetic software 23 computes the result of collection D2 received from the measuring software 22, then stores the result of computation D3 into the second storage area 252, and outputs the result of computation D3 to the communication software 24. The communication software 24 stores the result of computation D3 received from the arithmetic software 23 into the third storage area 253 and transmits the result of computation D3 to the external cloud system 4. The management software 20 determines whether each of the measuring software 22, the arithmetic software 23, and the communication software 24 is operating normally or not. The management software 20 terminates and restarts the software that is not operating normally.

In the structure monitoring system 1 as described above, the management software 20 automatically recovers the structure monitoring software 21 from an error. Therefore, recovery from an error can be swiftly made without causing trouble to the manager. Also, since only the software where an error has occurred is terminated and restarted, the recovery is not time-consuming. Therefore, the structure monitoring system 1 is highly convenient.

The management method, the structure monitoring device, and the structure monitoring system according to the present disclosure have been described, based on the illustrated embodiment. However, the present disclosure is not limited to this. The configuration of each part can be replaced with an arbitrary configuration having a similar function.

In the structure monitoring system, for example, update of the respective pieces of software 22 to 24 can be monitored. At the time of update, the target software can be terminated. After an update file is loaded, the terminated software can be restarted.

What is claimed is:
1. A management method for structure monitoring software based on management software,
the structure monitoring software comprising measuring software, arithmetic software, and communication software, wherein the measuring software collects an output signal from an inertial sensor, stores a result of collection into a first storage unit, and outputs the result of collection to the arithmetic software, the arithmetic software computes the result of collection received from the measuring software, stores a result of computation into a second storage unit, and outputs the result of computation to the communication software, the communication software stores the result of computation received from the arithmetic software into a third storage unit and transmits the result of computation to outside, and the management software determines whether each of the measuring software, the arithmetic software, and the communication software is operating normally or not, and terminates and restarts the software that is not operating normally.

2. The management method according to claim 1, wherein the inertial sensor stores the output signal into a fourth storage unit and outputs the output signal to the measuring software.

3. The management method according to claim 2, wherein when the measuring software does not operate normally and the management software terminates the measuring software, the measuring software, after restart, receives the output signal after the output signal received before the termination.

4. The management method according to claim 1, wherein when the arithmetic software does not operate normally and the management software terminates the arithmetic software, the arithmetic software, after restart, receives the result of collection after the result of collection received before the termination.

5. The management method according to claim 1, wherein when the communication software does not operate normally and the management software terminates the communication software, the communication software, after restart, receives the result of computation after the result of computation received before the termination.

6. The management method according to claim 1, wherein when a plurality of pieces of the software including the communication software do not operate normally, the management software terminates the software other than the communication software before terminating the communication software.

7. A structure monitoring device for use in a structure monitoring system, the structure monitoring device comprising a processor, a memory communicatively coupled to the processor, and an external interface to receive inputs from an inertial sensor, the structure monitoring device being configured to monitor a state of a structure within which the structure monitoring device is installed, the structure monitoring device comprising:

the memory storing software comprising:

a structure monitoring software configured to receive inputs from the inertial sensor and monitoring displacement of the structure when the structure monitoring software is executed on the processor; and a management software configured to manage the structure monitoring software when executed on the processor, wherein the structure monitoring software includes measuring software, arithmetic software, and communication software, the measuring software being configured to collect an output signal from the inertial sensor, store a result of collection into a first storage unit, and output the result of collection to the arithmetic software, the arithmetic software being configured to compute the result of collection received from the measuring software, store a result of computation into a second storage unit, and output the result of computation to the communication software, the communication software being configured to store the result of computation received from the arithmetic software into a third storage unit and transmit the result of computation to outside of the structure monitoring device, and the management software is configured to determines whether each of the measuring software, the arithmetic software, and the communication software is operating normally or not, and terminate and restart the software that is not operating normally.

8. A structure monitoring system comprising:

structure monitoring software;

management software managing the structure monitoring software; and an inertial sensor communicatively coupled to the structure monitoring software, wherein the structure monitoring software includes measuring software, arithmetic software, and communication software, the measuring software collects an output signal from the inertial sensor, stores a result of collection into a first storage unit, and outputs the result of collection to the arithmetic software, the arithmetic software computes the result of collection received from the measuring software, stores a result of computation into a second storage unit, and outputs the result of computation to the communication software, the communication software stores the result of computation received from the arithmetic software into a third storage unit and transmits the result of computation to outside, and the management software determines whether each of the measuring software, the arithmetic software, and the communication software is operating normally or not, and terminates and restarts the software that is not operating normally.

* * * * *